J. M. COMPANT & E. KRAUSKOPF.

Improvement in Throttle Valve and Stem.

No. 125,174.                                   Patented April 2, 1872.

Witnesses:                                        Inventor:
John Becker.                                      J. M. Compant.
Gustave Dieterich                                 E. Krauskopf
                                            Per
                                                  Attorneys.

125,174

UNITED STATES PATENT OFFICE.

JOHN M. COMPANT AND ENGELBERT KRAUSKOPF, OF FREDERICKSBURG, TEXAS.

IMPROVEMENT IN THROTTLE-VALVE STANDS AND STEMS.

Specification forming part of Letters Patent No. 125,174, dated April 2, 1872.

*To all whom it may concern:*

Be it known that we, JOHN M. COMPANT and ENGELBERT KRAUSKOPF, of Fredericksburg, in the county of Gillespie and State of Texas, have invented a new and Improved Throttle-Valve Stand and Stem; and we do hereby declare that the following is a full, clear, and exact description thereof, which will enable others skilled in the art to make and use the same, reference being had to the accompanying drawing forming part of this specification, in which—

Figure 1:
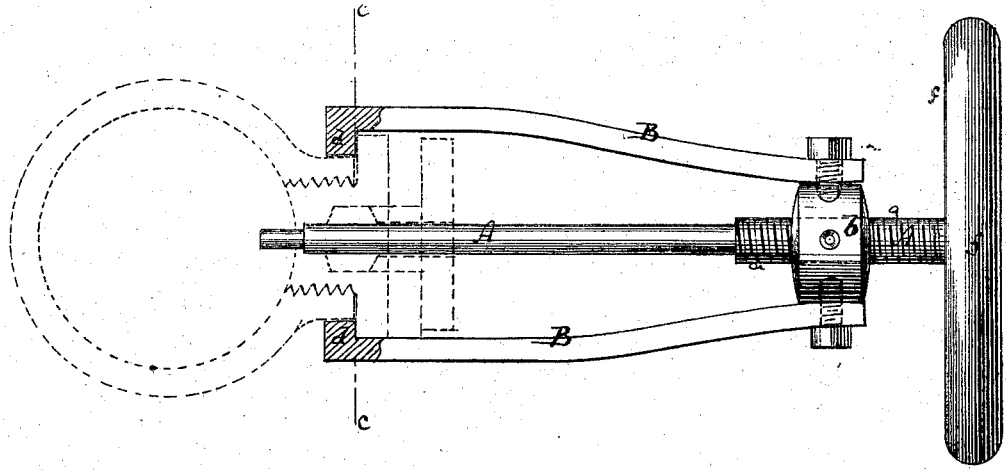
Figure 2:
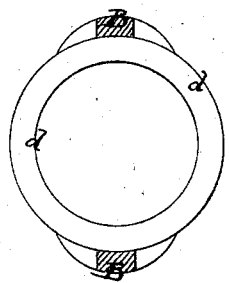
Figure 3:

Figure 1 represents a side view, partly in section, of our invention. Fig. 2 is a transverse section of the same on the line $c\ c$, Fig. 1. Fig. 3 is a detail side view of the braces, of a modified construction.

Similar letters of reference indicate corresponding parts.

This invention relates to a new arrangement of support for the stem of a throttle-valve, and has for its object to facilitate the lubricating of the screw and cause the parts to be firmly held in place. The invention consists in forming a screw on the outer end of the stem and fitting it into a nut that is, by braces, held to the stand.

A in the drawing represents the stem of the valve. Near its outer end it has formed on it a screw, $a$, which works in a nut, $b$. Braces B B, attached to the throttle-stand by means of a ring, $d$, as in Fig. 1, or by screws fitted through projecting ears $e$ at the ends of the braces, as in Fig. 3, serve to hold the nut $b$. The valve is attached to the inner end of the stem in the ordinary manner. The outer end of the stem carries a hand-wheel, $f$. By the outer nut and inner bearing the stem is securely held at both ends.

The screw can be conveniently lubricated, so that it will not grind in the nut, nor wear out in a short time, like the screws of ordinary throttle-stems.

Having thus described our invention, we claim as new and desire to secure by Letters Patent—

The arrangement of the stem A of a throttle-valve, threaded at $a$, and provided with a nut, $b$, held in position by braces B and set-screws C, as and for the purpose described.

JOHN M. COMPANT.
ENGELBERT KRAUSKOPF.

Witnesses:
ADOLF WEISS,
OTTO MARSCHALL.